May 11, 1943. G. A. HANSMAN 2,319,058
FASTENER
Filed April 6, 1939
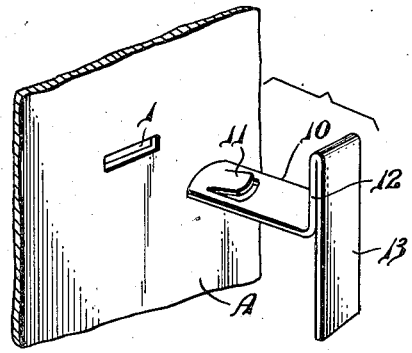
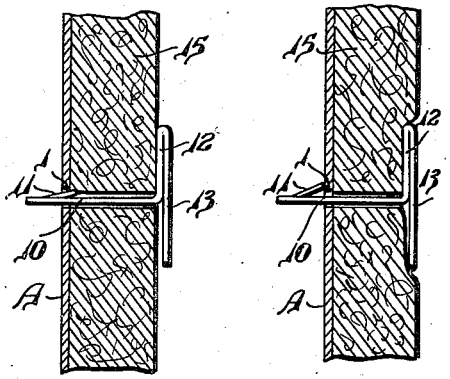
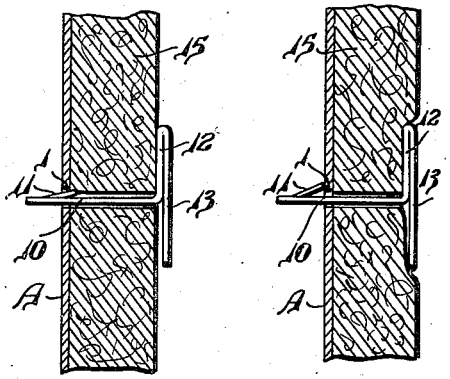
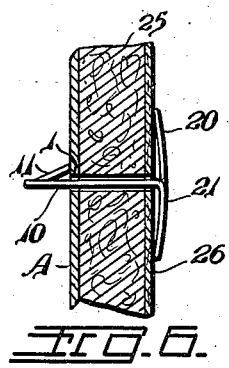
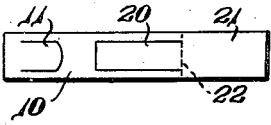
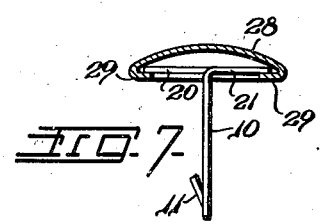
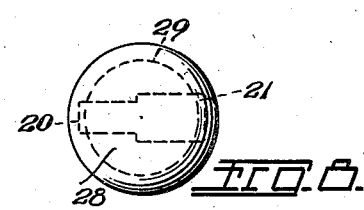
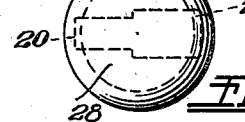
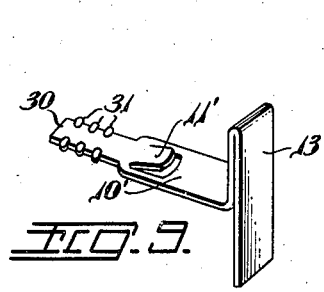
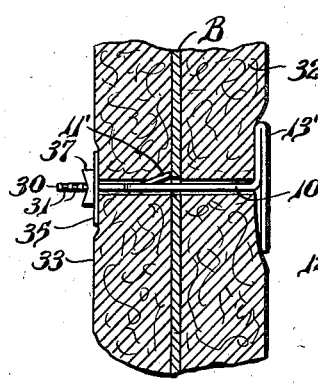
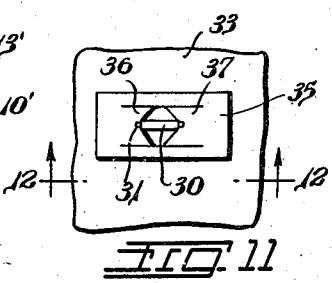
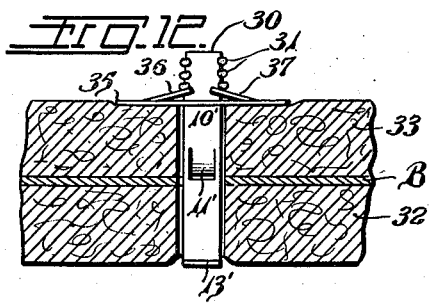
Inventor:
GEORGE A. HANSMAN
H. G. Lombard,
Attorney Patented May 11, 1943

2,319,058

UNITED STATES PATENT OFFICE 2,319,058

FASTENER

George A. Hansman, Rocky River, Ohio, assignor, by mesne assignments, to Tinnerman Products, Inc., Cleveland, Ohio, a corporation of Ohio Application April 6, 1939, Serial No. 266,363

9 Claims. (Cl. 85—5)

This invention deals with locking stud fasteners of the character designed for use in installations in which a relatively long shank is required to provide a positive holding means at one or more points spaced a substantial distance from the head of the fastener.

More particularly, the invention relates to a locking stud fastener having a relatively long shank and comprising only a single leg having a positive holding means thereon adapted to be easily and quickly sprung into applied fastening position in locking engagement with a support to fixedly and rigidly secure an article in mounted position on such support.

Fasteners of this character have a wide range and variety of uses and one of their more important uses takes place, for example, in the construction of closed car bodies in the securing of a padding or layer of insulation material to the dash of an automobile or some such similar part of a casing, cabinet, or the like. Often such an insulation pad is quite thick in order to satisfactorily prevent the passage of objectionable heat and annoying sounds from the motor to the interior of the car body. The pad is usually concealed by a finish covering of trim material secured therewith to the dash by fasteners extending into the area in which the motor is located under the hood of the automobile and, in this relation, it is especially desirable that the projecting shanks of the fasteners be as short as possible in order to eliminate tangling therewith of ignition wires etc., and otherwise minimize possibility of the same being accidentally dislodged or displaced from applied fastening position by one having occasion to work under the hood of the automobile.

In the manufacture of various heretofore known forms of snap fasteners, it is impractical to provide such a relatively long shank because the same cannot be drawn or pressed from ordinary sheet metal to the required length in the manner of an ordinary snap fastener without the use of special, expensive equipment which makes the cost of such fastenings prohibitive. Generally speaking, the improved locking fastener of the present invention overcomes such insufficiencies of the prior art structures in the provision of an extremely simple, inexpensive sheet metal fastening device having a shank requiring only a single, substantially flat leg member which may be readily provided in any desired length with a lug holding element thereon at a point in proximity to the free end thereof whereby in an installation the projecting portion of the shank is relatively short for the desired purposes and advantages heretofore mentioned.

A primary object of the present invention, therefore, is to provide a locking stud fastener requiring only a single shank leg member which may be constructed in any relatively long length without affecting the efficiency and holding action of the fastener and which has a comparatively short projecting shank portion extending only slightly beyond the supporting structure with which it is engaged in applied fastening position such that there is no exposed protruding portion thereof in the space at the side of the supporting structure opposite to that on which the material is secured by the fastener.

Another object of the invention is to provide a fastener of this character that includes a shank consisting only of a single leg member in which the holding means is provided by a lug element in proximity to the entering end thereof, with said lug element having a projecting relation exceeding the width of its cooperating aperture in the supporting structure to which it is applied to be secured thereto in a substantially locked fastening engagement.

A more specific object of the invention is to provide such an improved locking stud fastener which may be constructed from a simple, inexpensive strip of sheet metal in the manner of a single, substantially flat shank leg member having a locking lug element projecting from the flat face thereof a distance exceeding the width of the aperture in the wall to which the fastener is to be applied so that said lug element will bear against opposite side of the wall adjacent the aperture in a positive lacking engagement by which the fastener firmly and rigidly secures a layer of material to such wall.

A still further object contemplates the provision of a locking stud fastener of this type having an extended free end shank portion to which a layer of material may also be secured on the side of the supporting wall opposite to that from which the fastener is applied by means of a substantial locking plate or the like employed with said extended free end portion of the fastener.

Further objects and advantages and other new and useful features in the construction, arrangement and general combination of parts of the invention will be readily apparent to those skilled in the art as a description thereof proceeds with reference to the accompanying drawing in which like reference characters designate like parts throughout, and in which:

Fig. 1 is a perspective view of one form of the improved locking stud fastener of the invention shown in the relation it assumes on being applied to fastening engagement in an aperture in a supporting wall, also shown in perspective;

Fig. 2 is a cross-sectional view of an installation showing the initial step in applying the fastener to an apertured supporting wall for securing a layer of insulation material or the like thereto;

Fig. 3 is a similar view showing the fastener in final applied fastening position;

Fig. 4 represents a blank from which another form of the improved fastener may be constructed;

Fig. 5 is a perspective of a completed fastener provided from the blank represented in Fig. 4;

Fig. 6 is a sectional view of an installation embodying the fastener of Fig. 5;

Figs. 7 and 8 are section and plan views respectively illustrating the use of a finishing cap on the head of a fastener such as shown in Fig. 5;

Fig. 9 is a perspective of another form of the fastener employed for securing layers of material on both the front and rear faces of a supporting wall;

Fig. 10 is a sectional view of such an installation showing the application and use of the locking stud fastener of Fig. 9 together with a substantial locking plate applied to the free end of the shank thereof for securing a layer of material to the rear face of the supporting wall;

Fig. 11 is a fragmentary elevational view of an installation such as shown in Fig. 10 as viewed from the rear side thereof, showing the locking plate structure and its applied fastening position with the free end of the shank of the fastener; and, Fig. 12 is a sectional view of the installation as taken along line 12—12 of Fig. 11, looking in the direction of the arrows.

Referring now more particularly to the drawing, Fig. 1 shows a preferred form of locking stud fastener of the invention in the relation it assumes on being applied to fastening engagement in a cooperating aperture in a supporting wall such as an automobile dash which is constructed of any suitable material such as sheet metal, wood, fibre board, or the like. A fragment of the supporting wall is designated generally A, and inasmuch as the instant invention is intended mainly for use with metallic structures, such supporting wall usually is in the form of a metallic panel or plate-like element which is provided with perforations disposed at regular intervals and suitably spaced points along which the trim material or insulation pad extends in mounted position. Such perforations may be either round, rectangular or of any other suitable configuration, but preferably are provided in the manner of substantially rectangular slots 1, as shown in Fig. 1, to snugly receive the substantially flat shank of the fastener and thereby retain the same against shifting or displacement from applied fastening position in a completed installation.

The particular fastener shown in Fig. 1 is relatively simple in construction and therefore may be cheaply manufactured from a small, inexpensive strip of any suitable sheet metal, preferably of a spring nature such as spring steel or cold rolled steel having spring characteristics. The strip of metal has an end portion thereof designed to form an elongated shank comprising a single shank leg member 10 having a lug holding element 11 pressed therefrom in proximity to the free end thereof. The head or base of the fastener may be provided as desired from the remaining portion of the strip as by forming the same in the manner of a simple bent portion comprising a section 12 bent at substantial right angles to the shank and having a return bend angles to the shank and having a return bend providing an overlying end section 13 which, of course, may be of any selected length in forming a head member of any necessary or desirable size. The head of the fastener thus provided is simple in outline and since there are no materially projecting parts, there is little tendency of the fasteners to become tangled in the quantity production and handling thereof. A further advantage of a head structure of this character resides in the fact that it may be readily covered by a cup of sheet metal or the like comprising a substantial disk the peripheral edges of which are crimped or bent around the head to provide a neat finishing button appearance for the exposed end of the fastener.

It will be understood that the shank of the fastener is substantially rigid and can be provided in practically any required length without affecting the efficiency thereof or the effectiveness of its holding action in an installation. The fastener is therefore admirably suited for use in fastening relatively thick parts in an installation, and is particularly effective in securing material such as insulation pads and trim material to the dash of an automobile separating the body of the vehicle from the space in which the motor is located beneath the hood. Although the several forms of the invention are shown and described in connection with such an automobile dash installation, it is to be understood that the present invention fully contemplates the use of the fasteners in any related or equivalent type of construction without departing from the scope of the teachings or essential characteristics thereof.

Figs. 2 and 3 show the application and use of the fastener just described in securing a pad of insulation material or the like to panel A, representing a fragment of the dash which is usually constructed in the manner of a metal or wood panel, or the like. The aperture in the dash may be provided in any suitable form but preferably in the manner of a substantial slot designed to snugly receive the single shank leg member 10. The layer of insulation 15 may be formed of any selected material such as cork, jute, hair, etc., or a combination of any such suitably held together in a relatively thick, substantial pad which is usually soft and flexible and may be readily compressed in the application of the fasteners to holding position, as presently to be described. The insulation pad is perforated in any suitable manner to receive the shank of the fastener applied to the slot in the supporting wall or dash A, and if desired a covering of the trim material may be secured over the insulation pad to provide a neat, finished appearance to the interior of the car body, such trim material usually being of cardboard, fabrikoid, or the like.

The shank 10 of the fastener is substantially rigid and the lug holding element 11 thereon is provided in a manner to project from said shank a distance exceeding the width of the slot 1 in normal untensioned relation. Generally, the fastener is so designed that the extremity of the lug holding element is spaced from the head of the fastener a distance slightly less than the combined thickness of the parts secured to provide a rigid, tight installation as hereinafter more fully set forth. Accordingly, as shown in Fig. 2, in the initial application of the fastener to the slot in the supporting wall in securing the insulation pad 15 thereto, the blunt leading end of the fastener is readily seated in the slot 1, with said lug holding element bearing against the adjacent side wall thereof. And since the shank leg 10 of the fastener is substantially rigid and the layer of insulation relatively soft and flexible, the fastener may be easily and quickly advanced to final applied position by exerting suitable pressure on the head 13 of the fastener to compress the insulation material and simultaneously force the lug holding element 11 through the aperture sufficient to cause the extremity thereof to clear the slot and be disposed at the reverse side of the dash.

It will be understood that when such pressure is exerted on the head of the fastener, the flat side of the projecting lug element cams against the adjacent side wall of the aperture and is squeezed from its normal projecting relation toward the plane of the shank leg 10 thereby permitting the leading end portion of the shank to easily pass through the aperture. As soon as the extremity of the lug element thus clears the slot at the reverse side of the dash, the same is naturally free to assume its normal untensioned projecting relation exceeding the width of the aperture with the extremity thereof disposed in substantial abutting engagement with the reverse side of the support to provide a positive locked fastening engagement therewith substantially as shown in Fig. 3. Upon release of pressure on the head of the fastener, the compressed insulation material naturally tends to assume its normal condition and thus exerts an axial drawing action on the shank of the fastener to maintain the extremity of the lug element in such positive locked fastening engagement in the aperture with the insulation material firmly secured to the support by the fastener in a tight, rigid connection which is not subject to loosening or displacement incident to vibration, jarring strains, etc., taking place in the operation of the automobile.

In this respect, it is to be noted that the free end of the fastener extends only a relatively slight amount beyond the reverse side of the dash such that there is no objectionable projecting portion of the shank which might possibly become entangled with the ignition wires, etc., of the motor beneath the hood. If it becomes necessary or desirable to remove the fastener, this is readily accomplished simply by compressing the lug holding element toward the plane of the shank leg 10 sufficient to pass the same through the aperture in the support in a direction reverse to that in which the fastener was applied.

Fig. 5 shows another form of the fastener which is constructed in a manner to effect a considerable saving in the amount of material required to provide the head member of the device. This form of the fastener is provided from a blank such as represented in Fig. 4 wherein the shank leg 10 and lug holding element 11 are constructed in a manner substantially similar to that described with reference to Fig. 1. Intermediate its length the blank is suitably slit to define an element 20 which, together with the end portion 21, forms the head member of the device when the blank is bent along dotted line 22 to substantially the position shown in Fig. 5 to extend in a plane generally at right angles to the shank of the fastener. In this relation, said head sections 20, 21 may be formed in a generally concave configuration to provide resilient arched head designed to supply a spring take-up action in an installation in which a plurality of more or less rigid, nonflexible parts are secured. Accordingly, as shown in Fig. 6, a stiff fibre board insulation pad 25, or the like, may be secured to the apertured supporting panel A together with a covering of rigid trim material 26, for example, by means of a fastener of this type in substantially the manner aforesaid even though the fibre board is not sufficiently soft and compressible to provide the desired tight, rigid connection, as described with reference to Figs. 2 and 3. Thus, when pressure is removed from the head of the fastener after the lug holding element 11 is disposed in positive locked engagement with the support, the said arched head sections 20, 21 produce the necessary axial drawing action on the shank of the fastener to provide a tight, rigid installation of the parts secured under continuously effective spring tension.

As shown in Figs. 7 and 8, a head structure of this character is particularly suited for having attached thereto a finishing cap in the form of a sheet metal disk 28 or the like. The peripheral edge portions of the cap are crimped over the ends of the head sections 20, 21 or otherwise formed in the manner of inturned flanges 29 with which substantially flat head sections of a fastener of this kind may be connected by flexing the same to interlocked relation with such flanges substantially as shown in Fig. 7.

Figs. 9 to 12 inclusive show a further embodiment of the invention in which a dash or other supporting wall B is provided on both its front and rear faces with layers of insulation material or the like and the installation secured by the simple form of locking stud fastening shown in Fig. 9. This form of fastening device comprises a shank and head similar to that shown in Fig. 1 and a shank extension 30 provided, if desired, with suitable lug, shoulder or abutment means in the form of teeth or serrations or the like along the longitudinal edges thereof. Preferably such lug means are provided in the manner of substantial nibs 31 obtained by depressions on the flat faces of the shank extension 30 to deform the longitudinal edges thereof at spaced points in providing the desired projections thereon. This construction is considerably more practical than those in which substantial teeth are provided by distinct cut-outs along the longitudinal edges of the shank extension inasmuch as such cut-outs have a decided tendency to clog the tools of a die set causing an unnecessary rapid wear thereof and objectionable breaking on mutilation of the punches and delicate forming tools, requiring an all too frequent replacement thereof.

The fastening device of Fig. 9 is admirably suited for installations such as illustrated in Figs. 10 and 11 wherein the exterior layer 32 of insulation material or the like is secured to the front face of the supporting wall or dash B by means of its shank 10' and lug holding element 11' suitably provided thereon for application and use in substantially the manner described with reference to Figs. 2 and 3. Likewise, the head 13' of the fastener may, of course, be provided either in the manner shown similar to Fig. 1, or as illustrated in Fig. 5 in which event there is obtained a considerable saving in the amount of material required in the quantity production of the fastenings.

With the insulation pad 32 thus secured to the front face of the dash B, a second pad 33 of the same or different material may be readily secured to the rear face thereby by means of the shank extension 30 of the fastener which, obviously may be of any suitable length, depending on the thickness of said pad, to pass through a perforation therein and project onto the reverse side thereof. A substantial spring locking plate 35 or the like may then be applied to the projecting free end portion of the shank extension 30 to firmly and rigidly secure the insulation pad 33 to the rear side of the dash or other supporting panel B substantially as shown in Figs. 10 and 12.

Such spring locking plates are provided from relatively thin sections of ordinary sheet metal, cold rolled metal, spring steel, or the like and may be of round, button-like shape or of any other suitable configuration. However, the devices are most economically constructed from small, substantially rectangular sections obtained from strip stock and such a section providing a locking plate, is suitably slit and formed within its periphery to comprise one or more yieldable tongues, or the like, projecting out of the plane thereof and adapted for positive locking engagement with the shank extension 30 of the fastener under spring tension in applied fastening position. As best seen in Fig. 11, a preferred form of such a spring locking plate is provided with opposed, yieldable tongues 36, 37 having their extremities notched to present substantial recesses adapted for positive abutting relation with opposed nibs 31 on the shank extension in providing a substantially locked fastening engagement therewith as shown in Fig. 12. Since the body of the locking plate is resilient, said tongue elements are necessarily relatively yieldable with respect to each other and thereby readily adapted for sliding engagement with the shank extension in one direction in the manner of a substantial clutch device, and accordingly, may be speedily applied to fastening position by a substantial axial, thrust-like motion in a minimum of time and effort and tensioned in such fastening position in fixedly and rigidly securing the pad 33 to the rear side of the dash under continuously effective spring tension. Thus both of the layers of material 32, 33 are retained in assembled relation on the dash as insulating means for either side thereof by the action of the head of the fastener in direct engagement with the front pad 32 and the reverse engagement of the spring locking plate 35 against pad 33 as applied to the shank extension 30 with the notched extremities of the tongue elements thereof in substantial locked engagement with the nibs 31 provided thereon, as aforesaid.

While the invention has been described in detail with specific examples, such examples are illustrative only, since it will be apparent to those skilled in the art that other modifications within the spirit and scope of the invention may be constructed without departing from the teachings or essential characteristics thereof. The present embodiments are therefore to be considered in all respects as illustrative and not restrictive the scope of the invention being indicated by the appended claims rather than by the foregoing description, and all changes which come within the meaning and range of equivalency of the claims are therefore intended to be embraced therein.

Reference is made to my divisional application No. 451,856, filed July 22, 1942, for claims on those embodiments of my invention illustrated in the drawing and not herein claimed.

What is claimed and desired to be secured by United States Letters Patent is:

1. A locking fastener for securing an article to an apertured support, said fastener comprising a head for engaging the article and a shank adapted for locking engagement in the aperture in said support, said shank comprising a leg member and a yieldable lug element projecting from said leg member sufficiently to engage the support adjacent said aperture, said yieldable lug element being adapted to pass through said aperture from one side of said support to be disposed in abutting relation with the opposite side thereof in substantially locked fastening engagement therewith, an extension on said leg member adapted to extend through a second article to be secured to said opposite side of the support, shoulder means comprising one or more substantial nibs deformed outwardly on the longitudinal edges of said extension by depressions adjacent said longitudinal edges, and a locking plate adapted to be applied to said extension including a resilient tongue or the like for engaging said shoulder means on said extension to secure said second article to the support.

2. A locking fastener for securing an article to an apertured support, said fastener comprising a strip of sheet metal bent to provide a head for engaging the article and a shank adapted for locking engagement in the aperture in said support, said shank comprising a leg member and a yieldable lug element struck and formed from said leg member with its extremity projecting therefrom sufficiently to engage the support adjacent said aperture, said lug element being adapted to yield in passing through said aperture from one side of said support to a position in which the extremity thereof is disposed in abutting relation with the opposite side of said support in substantially locked fastening engagement therewith, an extension on said leg member adapted to extend through a second article to be secured to said opposite side of the support, shoulder means comprising one or more substantial nibs deformed outwardly on the longitudinal edges of said extension by depressions adjacent said longitudinal edges, and a locking plate adapted to be applied to said extension including a resilient tongue or the like for engaging said shoulder means on said extension to secure said second article to the support.

3. A locking fastener for securing a layer of compressible material to an apertured support, said fastener comprising a strip of sheet metal bent to provide a head for engaging the layer of material and a shank adapted for locking engagement in the aperture in the support, said shank comprising a leg member and a yieldable lug element struck and formed from said leg member to project out of the plane thereof sufficiently to engage the support adjacent said aperture, the extremity of said lug element being so spaced from the head of the fastener as to be adapted to secure the combined thickness of the support and layer of compressible material under compression, whereby upon application of the fastener to locking engagement with the support upon pressure on the head thereof, said layer of material is compressed and said lug element is adapted to yield in passing through said aperture from one side of said support to a position in which said extremity thereof is disposed in substantial abutting relation with the oppoiste side thereof firmly and rigidly securing said layer of material thereon, an extension on said leg member adapted to extend through an article to be secured to said opposite side of the support, shoulder means comprising one or more substantal nibs deformed outwardly on the longitudinal edges of said extension by depressions adjacent said longitudinal edges, and a locking plate adapted to be applied to said extension including a resilient tongue or the like for engaging said shoulder means on said extension to secure said article to the support.

4. A locking stud fastener for securing an article to an apertured support, said fastener comprising a head for engaging the article and a shank adapted for locking engagement in the aperture in said support, said shank comprising a leg member and an extension, a yieldable lug element projecting from said leg member sufficiently to engage the support adjacent said aperture, said extension being adapted to secure a second article to said opposite side of the support by means of a substantial locking plate applied thereto.

5. A locking stud fastener for securing an article to an apertured support, said fastener comprising a strip of sheet metal bent to provide a head for engaging the article and a shank adapted for locking engagement in the aperture in said support, said shank comprising a leg member and an extension, a yieldable lug element struck and formed from said leg member with its extremity projecting therefrom sufficiently to engage the support adjacent said aperture, said extension being adapted to secure a second article to said opposite side of the support by means of a substantial locking plate applied thereto.

6. A locking stud fastener for securing a layer of compressible material to an apertured support, said fastener comprising a strip of sheet metal bent to provide a head for engaging the layer of material and a shank adapted for locking engagement in the aperture in the support, said shank comprising a leg member and an extension, a yieldable lug element struck and formed from said leg member to project out of the plane thereof sufficiently to engage the support adjacent said aperture, the extremity of said lug element being so spaced from the head of the fastener as to be adapted to secure the combined thickness of the support and layer of compressible material under compression, whereby upon application of the fastener to locking engagement with the support upon pressure on the head thereof, said layer of material is compressed, said extension being adapted to secure a second layer of material to said opposite side of the support by means of a substantial locking plate applied thereto.

7. A locking fastener for securing an article to an apertured support, said fastener comprising a head for engaging the article and a shank adapted for locking engagement in the aperture in said support, said shank comprising a leg member and a yieldable lug element projecting from said leg member sufficiently to engage the support adjacent said aperture, an extension on said leg member adapted to extend through a second article to be secured to said opposite side of the support, and a locking plate applied to said extension having a resilient tongue or the like for engaging the longitudinal edge of said extension to secure said second article to the support.

8. A locking fastener for securing an article to an apertured support, said fastener comprising a strip of sheet metal bent to provide a head for engaging the article and a shank adapted for locking engagement in the aperture in said support, said shank comprising a leg member and a yieldable lug element struck and formed from said leg member with its extremity projecting therefrom sufficiently to engage the support adjacent said aperture, an extension on said leg member adapted to extend through a second article to be secured to said opposite side of the support, and a locking plate applied to said extension having a resilient tongue or the like for engaging the longitudinal edge of said extension to secure said second article to the support.

9. A locking fastener for securing a layer of compressible material to an apertured support, said fastener comprising a strip of sheet metal bent to provide a head for engaging the layer of material and a shank adapted for locking engagement in the aperture in the support, said shank comprising a leg member and a yieldable lug element struck and formed from said leg member to project out of the plane thereof sufficiently to engage the support adjacent said aperture, the extremity of said lug element being so spaced from the head of the fastener whereby upon application of the fastener to locking engagement with the support upon pressure on the head thereof, said layer of material is compressed, an extension on said leg member adapted to extend through an article to be secured to said opposite side of the support, and a locking plate applied to said extension having a resilient tongue or the like for engaging the longitudinal edge of said extension to secure said article to the support.

GEORGE A. HANSMAN.